（12）United States Patent
Nielsen

(10) Patent No.: US 9,366,223 B2
(45) Date of Patent: Jun. 14, 2016

(54) NOTCH-REDUCED COMPOSITE JOINT

(75) Inventor: Lars Nielsen, Skanderborg (DK)

(73) Assignee: LM GLASFIBER A/S, Kolding (DK)

( * ) Notice: Subject to any disclaimer, the term of this patent is extended or adjusted under 35 U.S.C. 154(b) by 583 days.

(21) Appl. No.: 13/808,603

(22) PCT Filed: Jul. 8, 2011

(86) PCT No.: PCT/EP2011/061622
§ 371 (c)(1),
(2), (4) Date: Jan. 7, 2013

(87) PCT Pub. No.: WO2012/004383
PCT Pub. Date: Jan. 12, 2012

(65) Prior Publication Data
US 2013/0115095 A1 May 9, 2013

(30) Foreign Application Priority Data

Jul. 8, 2010 (EP) .................................... 10168803

(51) Int. Cl.
*F03D 1/06* (2006.01)

(52) U.S. Cl.
CPC ................ *F03D 1/06* (2013.01); *F03D 1/0675* (2013.01); F05B 2280/6003 (2013.01); F05C 2253/04 (2013.01); Y02E 10/721 (2013.01)

(58) Field of Classification Search
CPC .......... F03D 1/0675; F03D 1/065; F03D 1/06
See application file for complete search history.

(56) References Cited

U.S. PATENT DOCUMENTS

| 5,375,324 A * | 12/1994 | Wallace et al. ........... 416/196 A |
| 2010/0098549 A1 | 4/2010 | Mironov | |

FOREIGN PATENT DOCUMENTS

| EP | 1754589 A1 | 2/2007 |
| JP | 61192864 A | 8/1986 |
| WO | 2008086805 A2 | 7/2008 |
| WO | 2009155921 A1 | 12/2009 |
| WO | 2010023140 A1 | 3/2010 |
| WO | 2010056599 A1 | 5/2010 |

\* cited by examiner

*Primary Examiner* — Richard Edgar
(74) *Attorney, Agent, or Firm* — Nath Goldberg & Meyer; Jerald L. Meyer; Tanya E. Harkins

(57) ABSTRACT

A wind turbine blade comprising a profiled hollow contour, at least one reinforcing beam (15) placed between two shell body parts (13, 14), the beam comprising a first beam flange (16*a*) and an opposing second beam flange (16*b*), a beam body (17) connected to the first beam flange (16*a*) by a first transition area (32*a*) and connected to the second beam flange (16*b*) by a second transition area (32*b*). The beam body comprises a beam core (22). The beam core (22) comprises a first outer core surface (24*a*) and an opposite second outer core surface (24*b*). The beam body further comprises a web (50) arranged on the outer core surfaces. The flanges (16*a*, 16*b*) and the web (50) are made from a fiber-reinforced polymer. The transition areas (32*a*, 32*b*) comprise notch-reducing mean formed of rounded corners of the beam core (22).

19 Claims, 4 Drawing Sheets

NOTCH-REDUCED COMPOSITE JOINT

Figure 1:
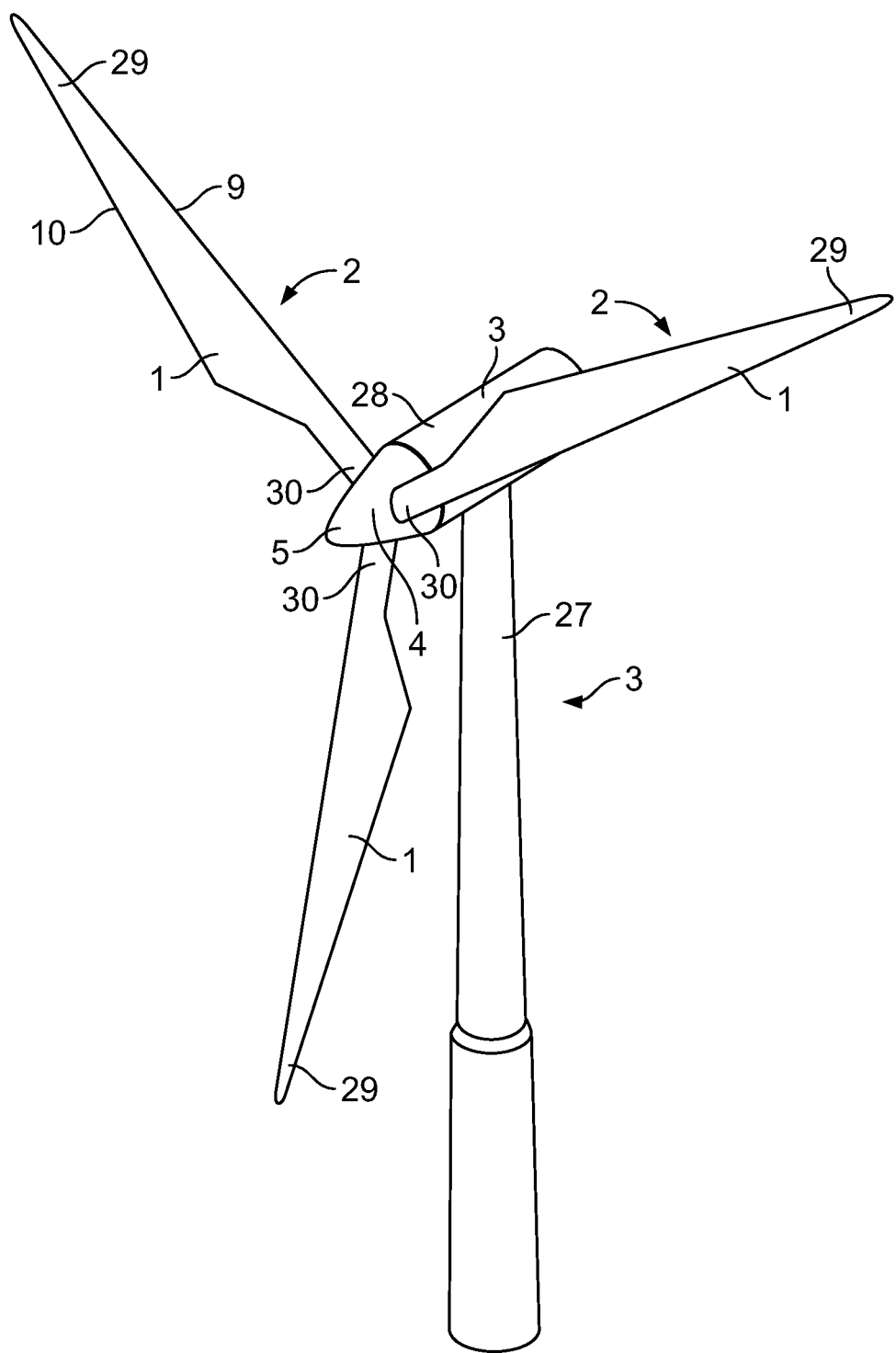

This is a National Phase Application filed under 35 U.S.C. 371 as a national stage of PCT/EP20111061622, filed Jul. 8, 2011, an application claiming the benefit from the European patent Application EP 10168803.4, filed Jul. 8, 2010, the content of each of which is hereby incorporated by reference in its entirety.

TECHNICAL FIELD

The present invention relates to a wind turbine blade for a rotor of a wind turbine and relates also to a wind turbine comprising a wind turbine blade.

BACKGROUND

Normally, a wind turbine blade for a wind turbine comprises an aerodynamic shell made by two shell parts and at least one beam, normally two or three beams, placed between the shell parts and adhered to the inner side of the shell parts by gluing. The beams have a reinforcing function for the turbine blade during operation. The shells are often connected to each other in a trailing edge and a leading edge and normally joined by gluing, alternatively, the shell parts may be integrally formed. The blade further comprises laminates in the shells for reinforcing these shells. The beams absorb large forces during the operation of the blades. Especially the areas close to where the beams are connected to the inside of the shells are subjected to heavy loads which may result in fracture in the beams.

WO 2008/086805 discloses a wind turbine blade provided with an internal reinforcing floor between the trailing edge and the leading edge to improve resistance against de-formation of the shell. This solution increases the complexity of the structure and thus also complexity of manufacture of the blade.

U.S. Pat. No. 5,375,324 discloses a wind turbine blade provided with longitudinally extending I-beams connected to an inner face of blade shell halves. The I-beams are made of fibre-reinforced polymer and are not provided with a beam core of a core material.

WO 2010/023140 discloses a wind turbine blade provided with a longitudinally extending box spar having opposite faces being glued to inner faces of blade shell halves, the glue joints having concave frontline surfaces so as to provide a notch-reducing effect in the glue joints.

JP 61192864 discloses a wind turbine blade formed of three shell parts being mutually connected by means of an adhesive, and a longitudinal beam connected to opposite inner faces of the shell body formed of the three shell parts.

Finally, a wind turbine blade essentially as stated in the preamble to claim 1 is known.

DISCLOSURE OF THE INVENTION

A first aspect of the present invention is at least partly to overcome the disadvantages of the prior art mentioned above and to provide a wind turbine blade, where the risk of fracture and failure of the beam is reduced. These aspects and the advantages become evident from the description below and are obtained by a wind turbine blade for a rotor of a wind turbine comprising a profiled contour formed by a hollow shell body made of fibre-reinforced resin, wherein the hollow shell body comprises a first shell body part and a second shell body part being interconnected and at least one prefabricated longitudinally extending beam having an I-shaped cross-section and being formed of fibre-reinforced resin comprising a number of fibre layers, said beam comprising a first beam flange and a second beam flange and a beam body extending between the flanges, said beam body comprising a beam core having a first and a second mutually interspaced outer lateral faces and a first and a second mutually interspaced end faces, each of the lateral faces being covered by a web of fibre-reinforced polymer, the first end face being covered by fibre-reinforced polymer of the first beam flange and the second end face being covered by fibre-reinforced polymer of the second beam flange, the beam body being integrally formed with and connected to the first beam flange by two opposite first transition areas comprising fibre-reinforced resin and integrally formed with and connected to the second beam flange by two opposite second transition areas comprising fibre-reinforced resin, the first beam flange being connected to an inner surface of the first shell part and the second beam flange being connected to an inner surface of the second shell part, wherein the transition areas comprise notch-reducing means comprising a rounded or chamfered connection between each of the lateral faces and each of the adjacent end faces of the beam core.

Tests have shown that by providing the transition areas with notch reducing means formed of rounded or chamfered corners of the beam core, it is possible to transfer forces from the webs to the flanges without any risk of failure and fracture in the transition areas, as the transitions area are able to absorb the forces. By this construction, the loading of the joints between the shell body parts of the blade is reduced at the leading and trailing edges. The risk of failure, such as buckling, is also reduced.

In an embodiment of the invention, in the transition areas the fibre layers of each web continues into the adjacent flange via a concave course in a web-connected flange part having a concavely curved outer surface.

Thereby, the concave course of the fibre layers of the web-connecting flange part provides a notch reduction and thereby reduces or eliminates the risk of fracture or failure of the beam.

According to a further embodiment in the transition areas an inner chamber accommodating resin is formed between a first inner surface defined by a rounded or chamfered connection between a lateral face and an end face of the beam core defined by fibre layers covering the said connection, a second inner surface defined by the fibre layers of the web-connecting flange part and a third inner surface defined by the fibre layers of the adjacent flange.

The structure of a chamber together with a sloping or rounded course provides a significant notch-reducing effect. The beam will be able to transfer large forces compared to the conventional way of constructing the transition area.

In another embodiment of the invention, a curvature radius of the second inner surface is a function of the thickness of the beam core, said curvature radius is increased when the thickness of the beam core between the lateral faces thereof is increased.

According to an embodiment of the invention, a curvature radius of the first surface, i.e. the rounded corner of the core, is a function of the thickness of the beam core between the lateral faces thereof, said curved radius being increased when the thickness of the beam core is increased.

In a further embodiment, the entire surface of the beam core including the lateral faces, the end faces and the rounded or chamfered connection between each end face and each lateral face are covered by fibre layers.

As a result, the fibre layers covering the outer surface, especially the rounded or chamfered corner of the core provides a notch-reducing effect.

In another embodiment of the invention, the chamber comprises filler embedded in the resin.

By providing filler in the chamber, the strength of the transition area is increased as the filler ensures that the risk of dry areas is reduced.

In a further embodiment of the invention, the filler comprises a longitudinally extending rope for instance comprising glass fibres, and preferably being arranged at the first inner surface.

In this way, the filler is laid out or arranged in an easy manner. However, also glass waste in various geometrical shapes, such as powder, small rounded or edged particles, could be used. By using such a filler, the risk of areas with dry spots is reduced.

In an additional embodiment of the invention, the filler is a unidirectional rope. Another usable rope is a braided or woven fibre rope.

By using a rope as filler, the risk of fracture is reduced as this material has a sufficient strength.

In an embodiment of the invention, the diameter of the fibre rope is 6-15 mm, preferably 9-12 mm.

The diameter of the fibre rope is dependent on an angle between the first surface and the third surface, the larger angle, the larger the diameter.

In a further embodiment of the invention, the hollow shell body is a profile contour in the radial direction and divided into a root region with a substantially circular or elliptical profile closest to the hub, an airfoil region with a lift-generating profile furthest away from the hub, and preferably a transition region between the root region and the airfoil region, the transition region having a profile gradually changing in the radial direction from the circular or elliptical profile of the root region to the lift-generating profile of the airfoil region.

In an additional embodiment of the invention, the connection between the inner face of the shell bodies and the flanges of the beam are provided by a bonding agent, such as glue.

In an embodiment of the invention, the filler material and/or the fibre material of the beam comprises glass fibres, carbon fibres, steel fibres, aramid or plant fibres.

In another embodiment of the invention, the first shell body part forms part of a pressure side, and the second shell part may form part of the suction side.

In a further embodiment of the invention the chamber is triangular in cross-section.

According to another embodiment of the invention, the beam core is made of a material having a lower density than the fibre-reinforced polymer, preferably a lower density than the polymer.

In yet another embodiment of the invention, the beam core is made of a foamed material, such as a foamed polymer, or of balsawood.

In a further embodiment of the invention the beam is substantially symmetrical about a longitudinal central plane.

In an additional embodiment of the invention, the beam is manufactured by vacuum assisted resin transfer (VARTM).

In another embodiment of the invention, the beam is manufactured by using fibre materials pre-impregnated with resin (prepreg.).

According to an embodiment the connections between at least one of the end faces and the adjacent lateral faces of the beam core are formed by a section of a circle extending between the lateral faces, especially a half circle as seen in cross section.

According to a further embodiment the lateral faces of the beam core are essentially parallel.

In an embodiment of the invention the lateral faces of the beam core converge towards each other from the first towards the second end face.

According to an additional embodiment the blade has a length of at least 35, 40, 45, 50, 55 or 60 meters.

In a further embodiment of the invention, the distance between the first outer lateral core surface and the second outer lateral core surface increases towards the first beam flange and towards the second beam flange.

The radius of curvature of the outer surface of the web-connecting flange part is preferably at least one tenth and more preferred between about one tenth of and four times the width of the core between the lateral faces thereof in the region of the web-connecting flange part.

The length of the chamfers or the radius of the curvature of the roundings of the beam core is preferably at least one tenth and more preferred between about one tenth of and half the width of the beam core between the lateral surfaces thereof in the region of the chamfer or rounding. Thus, in an embodiment the radius of curvature is half the width of the core, i.e. the end face of the core is a half circle.

BRIEF DESCRIPTION OF THE DRAWING(S)

Figure 2:
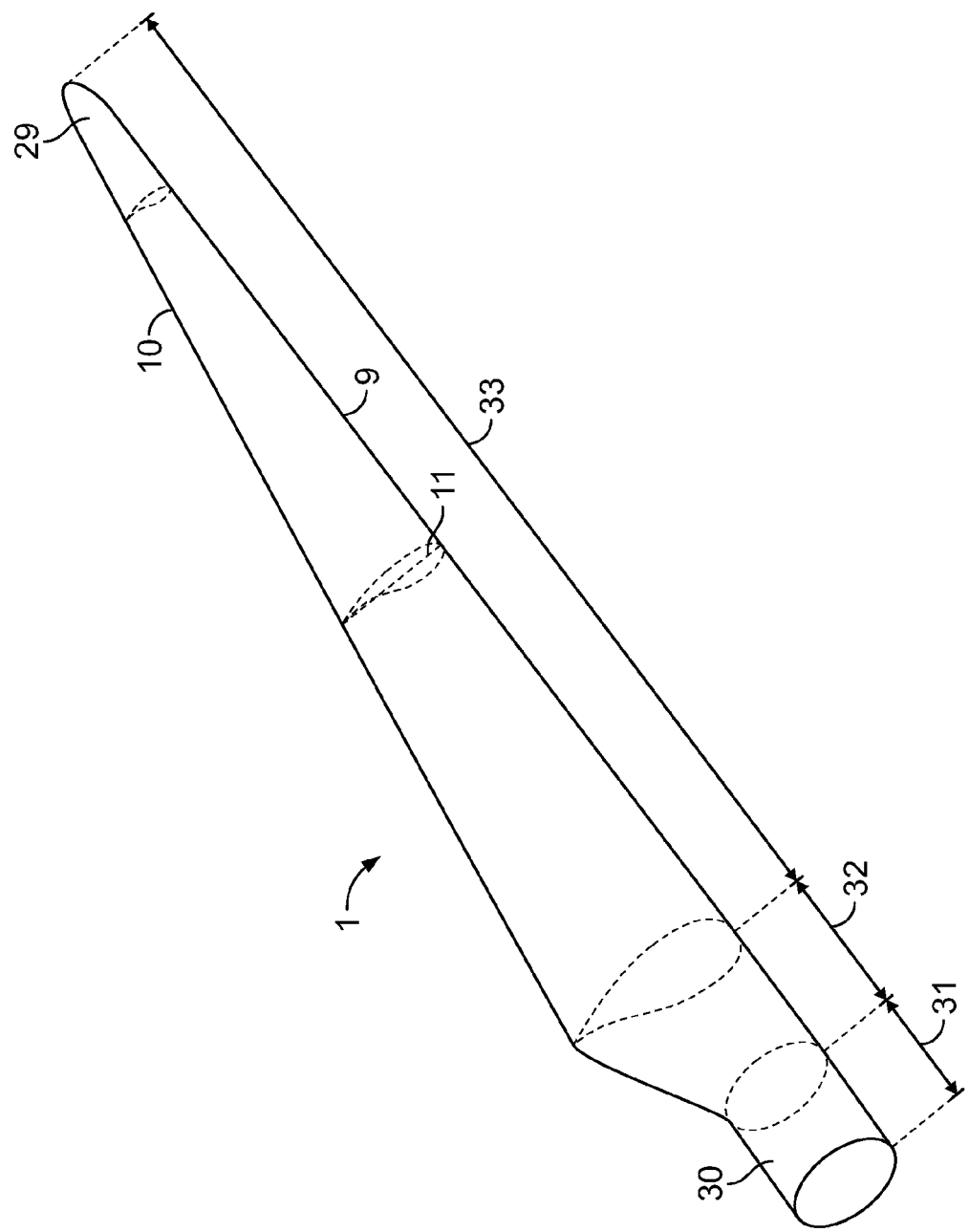
Figure 3:
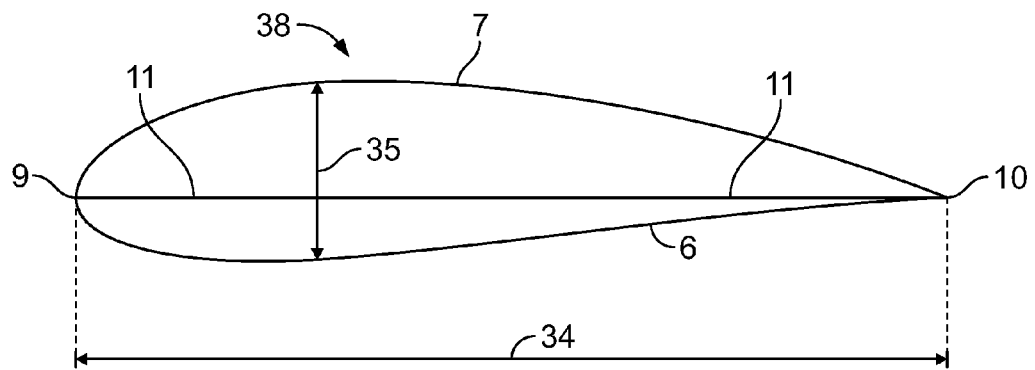
Figure 4:
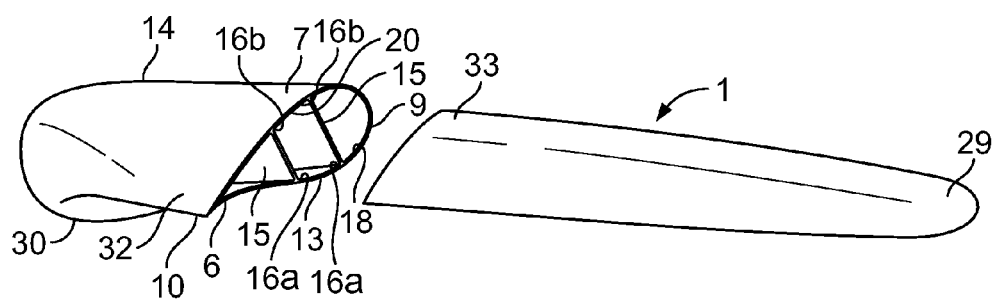
Figure 5:
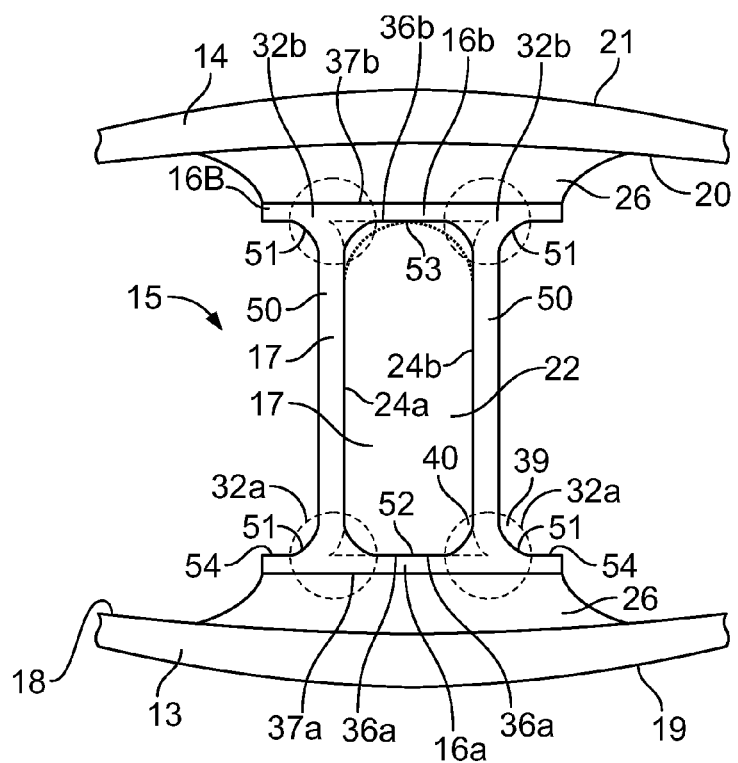
Figure 6:
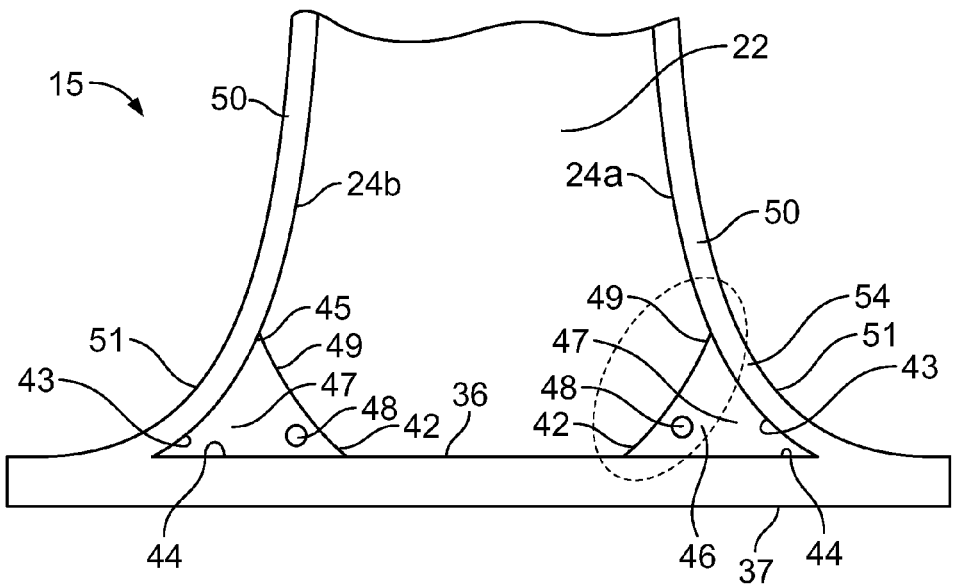

The invention is explained in detail below with reference to the drawing(s), in which FIG. 1 shows a wind turbine, FIG. 2 shows a perspective view of a conventional wind turbine blade, FIG. 3 shows a schematic view of an airfoil profile, FIG. 4 shows a wind turbine blade, which has been cut through, FIG. 5 is a cross section of a part of a wind turbine blade and a reinforcing beam according to the invention, and FIG. 6 is a cross section of a part of a reinforcing beam showing details of transition areas.

DETAILED DESCRIPTION OF THE INVENTION

FIG. 1 illustrates a conventional, modern upwind wind turbine according to the so-called "Danish concept" with a tower 27, a nacelle 28 and a rotor 2 with a substantially horizontal rotor shaft 4. The rotor 2 includes a hub 5 and three blades 1 extending radially from the hub 5, each having a blade root 30 nearest the hub, and a blade tip 29 furthest from the hub 5.

FIG. 3 shows a schematic view of an airfoil profile 38 of a typical blade of a wind turbine depicted with the various parameters, which are typically used to define the geometrical shape of an airfoil. The airfoil profile 38 has a pressure side 6 and a suction side 7, which during use, i.e. during rotation of the rotor, normally face towards the windward side and the rearward side, respectively. The airfoil 38 has a chord 11 with a chord length 34 extending between a leading edge 9 and a trailing edge 10 of the blade. The airfoil 38 has a thickness 35, which is defined as a distance between the pressure side 6 and the suction side 7. The thickness 35 of the airfoil varies along the chord 11.

As seen from FIG. 2, the conventional blade 1 comprises a root area 31 closest to the hub, an airfoil area 33 furthest away from the hub, and a transition area 32 between the root area 31 and the airfoil area 33. The blade 1 comprises the leading edge 9 facing the direction of rotation of the blade 1 when the blade is mounted on the hub, and the trailing edge 6 facing in the opposite direction to the leading edge 9. The airfoil area 33 has an ideal or almost ideal blade shape, whereas the root area 31 has a substantially circular cross-section, which reduces storm loads and makes it easy and safe to mount the blade 1 to the hub. Preferably, the diameter of the root area 31 is constant along the entire root area 31. The transition area 32 has a shape, gradually changing from the circular shape of the root area 31 to the airfoil profile of the airfoil area 33. The width of the transition area 32 increases substantially linearly with the increasing distance from the hub.

The airfoil area 33 has an airfoil profile with a chord plane 11 extending between the leading edge 9 and the trailing edge 10 of the blade 1. The width of the chord plane decreases with increasing distance L from the root area 31. It should be noted that the chord plane is not necessarily straight over its entire extent since the blade may be twisted and/or curved, thus providing a chord plane with a correspondingly twisted and/or curved course. Often the blades are twisted to compensate for the local velocity of the blade being dependent on the radius from the hub. Due to the circular cross section, the root area 31 does not contribute to the production of the wind turbine and, in fact, lowers the production a little because of the wind resistance.

FIG. 4 shows a perspective view of a blade 1, which has been cut through so as to show the position of two reinforcing beams 15. The blade 1 comprises a root section 30 and a blade tip 29, and therebetween the transition area 32 and the airfoil area 33. The blade 1 comprises a first shell body part 13 and a second shell body part 14, which are connected to each other at a leading edge 9 and a trailing edge 10. The reinforcing beams 15 are arranged between the two shell body parts 13, 14. In the depicted embodiment, the beams 15 are placed substantially parallel and each comprises a first beam flange 16a connected to the inner surface 18 of the first shell body part 13 and the second beam flange 16b connected to the inner surface 20 of the second shell body part 14. The beams are connected to the shell parts by gluing. The beams are placed in the transition area 32 and at least a part of the airfoil area 33. The blade is manufactured in a conventional way and by a material such as a composite consisting of fibre-reinforced polymer. The polymer may be a resin, such as polyester, vinylester or epoxy. The fibres may be any suitable type of fibres, such as glass fibres, carbon fibres, steel fibres, bamboo or wood or any combination thereof.

FIG. 5 is a cross section of a reinforcing beam 15 according to one embodiment of the invention and shows details of one of the beams 15 shown in FIG. 4. The beam 15 comprises a beam core 22, which is advantageously made by a foam material. The beam core 22 is defined by a first outer lateral core surface 24a, an opposite second outer lateral core surface 24b, a first outer core end face 52 and a second outer core end face 53 also placed opposite each other and connecting the first and second core surfaces 24a, 24b. The cross section of the beam core 22 is essentially rectangular with rounded or chamfered corners. The first and second outer core surfaces 24a, 24b are covered by a web 50a, 50b, the web being formed of a fibre-reinforced resin comprising a number of fibre layers.

The first 52 and second 53 core end faces define inner surfaces 36a, 36b of the respective beam flanges 16a, 16b, the beam flanges being made of a fibre-reinforced resin material comprising a number of fibre layers.

The beam core 22 and the webs 50 form a beam body 17. The first beam flange 16a and the second beam flange 16b comprises an outer surface 37a and 37b, respectively, facing towards the inside of the first and second shell body parts, respectively, and the opposing inner surfaces of the flanges 36a, 36b abut the first 52 and second 53 core end faces of the beam core.

The outer surfaces 37a and 37b of the flanges 16a, 16b are bonded to the inner surfaces 18, 20 of the shells by a glue 26 or a similar bonding agent. The beam flanges 16 might be symmetrically arranged around the longitudinal axes of the beam core 22. By such a construction, it might be easier to place the flanges and the reinforcing beam correct in relation to the shell body parts and ensure that sufficient glue is applied.

In the area between the beam body 17 and the respective beam flanges 16a, 16b the beam body is connected to the first beam flange 16a by means of two opposite first transition areas 32a comprising fibre-reinforced polymer. Correspondingly, the beam body is connected to the second beam flange 16b by means of two opposite second transition areas 32b comprising fibre-reinforced polymer. The transition areas 32 transfer the forces between the beam body 17 and the beam flanges 16a, 16b and comprise notch-reducing means by means of which the risk of fracture of the beam is reduced. The first transition areas 32a are defined as transition areas closest to the first shell body part 13, and the second transition areas 32b are defined as transition areas closest to the second shell body part 14.

Each of the first and second transition areas 32a, 32b comprises an outer transition area 39 and an inner transition area 40. The outer transition area 39 comprises a flange area located between the outer surface of the flange and the web 50—named web-connecting flange part 54—and is connected integrally with the web 50 that covers the core beam 22 by means of fibre-reinforced polymer. In other words, fibre layers of the web extend into the flange. The outer surface 51 of the web-connecting flange part 54 is concavely curved with a radius of the curvature that is dependent on the thickness of the web 50. The radius of curvature of the outer surface 51 is preferably at least one tenth and more preferred between about one tenth of and about four times the width of the core between the lateral faces thereof in the region of the web-connecting flange part. It is important that the fibre-reinforced resin in this area is made in one piece as this will increase the ability to transfer the forces in the region without any fracture in the transition area. The web-connecting flange part 54 of the outer transition area 39 comprises a second surface 43 defined by the fibre layers of the fibre-reinforced polymer.

Each of the inner transition areas 40 comprises a first surface 42 defined in the embodiment shown in FIGS. 5 and 6 by the respective rounded or chamfered corners 49 between each lateral face 24a, 24b and each end face 52, 53 of the beam core. It should, however, be noted that all the faces of the core including the chamfered or rounded corners of the core may be covered by fibre layers. By having a chamfered or rounded surface, the stresses in this region are reduced and the risk of fracture is reduced. In case the corner has a rounded shape, the radius of the curvature is dependent on the thickness of the web 50. The thicker the web, the larger the radius of the curvature.

The length of the chamfers or the radius of the curvature of the roundings of the beam core is preferably at least one tenth and more preferred between about one tenth of and half the width of the beam core between the lateral surfaces thereof in the region of the chamfer or rounding. Thus, in an embodiment the radius of curvature is half the width of the core, i.e. the end face of the core is a half circle, as shown by the dotted line for the second end face in FIG. 5.

FIG. 6 shows a part of a reinforcing beam 15 comprising the beam core 22. The opposing sides of the beam core 22, i.e.

the first outer lateral core face 24a and the second outer lateral core face 24b, are covered by a web 50, said web being a fibre-reinforced resin. The web 50 continues in the web-connecting flange part 54 towards the flange and is delimited by the curved outer web surface 51 with a radius of the curvature that is a function of the thickness of the web 50.

In each of the inner transition areas 40, the beam core 22 is provided with a chamfer or rounding 49 forming the first surface 42. The chamfers or roundings converge towards each other, as shown in FIG. 6. As mentioned above, it should be noted that the entire outer surface of the beam core including the chamfered or rounded corners may be covered by fibre layers. Thereby, the fibre layers covering the chamfered or rounded corners define the outer surface 49. It has been shown that a notch-reducing effect is obtained when the core is chamfered or rounded in the above areas.

Opposite the first surface 42 is a second surface 43 defined by the fibre layers of the web-connecting flange part 54. The first 42 and the second 43 surfaces are connected to each other by a third surface 44 defined by the fibre layers of the flange 36. Finally, opposite the third surface 44, the first surface 42 and the second surface 43 meet in an edge 45. In this way, a chamber 46 is defined by the three surfaces. This chamber has also an impact on the notch-reducing effect in the transition area and increases the resistance against fracture and failure.

The chamber 46 accommodates the resin 47 and advantageously also a filler 48. The filler 48 may be small particles of glass or a fibreglass rope, preferably a unidirectional rope or a non-woven fibreglass rope completely impregnated, i.e. wetted, with resin so as to avoid dry spots. The diameter of the fibreglass rope is normally between 6-15 mm, preferably between 9-12 mm, but it depends on the geometry and size of the chamfer 49.

Advantageously, the filler 48 is placed close to the first surface 42 and placed throughout the length of the beam.

The beam 15 may advantageously be manufactured by means of VARTM (vacuum-assisted resin transfer).

LIST OF REFERENCE NUMERALS

1) Blade
2) Water
3) Wind turbine
4) Rotor shaft
5) Hub
6) Pressure side
7) Suction side
8) Profiled contour
9) Leading edge
10) Trailing edge
11) Chord
12) Reinforcement of the shells
13) First shell body part
14) Second shell body part
15) Reinforcing beam
16) Beam flange
16a) First beam flange
16b) Second beam flange
17) Beam body
18) Inner surface of the first shell body part
19) Outer surface of the first shell body part
20) Inner surface of the second shell body part
21) Outer surface of the second shell body part
22) Beam core
24a) First outer lateral core face
24b) Second outer lateral core face
25) Outer surface of the beam layer
26) Glue adhesive
27) Tower
28) Nacelle
29) Blade tip
30) Blade root
31) Root area
32) Transition areas
32a) First transition areas
32b) Second transition areas
33) Airfoil area
34) Chord length
35) Airfoil thickness
36a) Inner surface of the flange 16a
36b) Inner surface of the flange 16b
37a) Outer surface of the flange 16a
37b) Outer surface of the flange 16b
38) Airfoil profile
39) Outer transition area
40) Inner transition area
41) Filler
42) First surface
43) Second surface
44) Third surface
45) Edge
46) Chamber
47) Resin
48) Filler
49) Chamfer or rounding
50) Web
51) Outer surface of 54
52) First outer core end face
53) Second outer core end face
54 Web-connecting flange part

The invention claimed is:

1. A wind turbine blade for a rotor of a wind turbine (3) comprising a profiled contour (8) formed by a hollow shell body made of fibre-reinforced resin, wherein the hollow shell body comprises
a first shell body part (13) and a second shell body part (14) being interconnected and at least one prefabricated longitudinally extending beam (15) having an I-shaped cross-section and being formed of fibre-reinforced resin comprising a number of fibre layers, said beam (15) comprising a first beam flange (16a) and a second beam flange (16b) and a beam body (17) extending between the flanges,
said beam body (17) comprising a beam core (22) having a first (24a) and a second (24b) mutually interspaced outer lateral faces and a first (52) and a second (53) mutually interspaced end faces, each of the lateral faces being covered by a web (50) of fibre-reinforced polymer, the first end face being covered by fibre-reinforced polymer of the first beam flange (16a) and the second end face being covered by fibre-reinforced polymer of the second beam flange (16b),
the beam body (17) being integrally formed with and connected to the first beam flange (16a) by two opposite first transition areas (32a) comprising fibre-reinforced resin and integrally formed with and connected to the second beam flange (16b) by two opposite second transition areas (32b) comprising fibre-reinforced resin,
the first beam flange (16a) being connected to an inner surface (18) of the first shell part (13) and the second beam flange (16b) being connected to an inner surface (19) of the second shell part (14),
characterized in that the transition areas (32a, 32b) comprise notch-reducing means comprising a rounded or chamfered connection between each of the lateral faces (24a, 24b) and each of the adjacent end faces (52, 53) of the beam core (22).

2. Blade according to claim 1, wherein in the transition areas (32a, 32b) the fibre layers of each web (50) continues into the adjacent flange via a concave course in a web-connected flange part (54) having a concavely curved outer surface (51).

3. Blade according to claim 2, wherein in the transition areas (32a, 32b) an inner chamber (46) accommodating resin is formed between a first inner surface (42) defined by the rounded or chamfered connection between a lateral face and an end face of the beam core (22) defined by fibre layers covering the said connection, a second inner surface (43) defined by the fibre layers of the web-connecting flange part (54) and a third inner surface (44) defined by the fibre layers of the adjacent flange (16a).

4. Blade according to claim 3, wherein the chamber (46) comprises a filler (48) embedded in the resin.

5. Blade according to claim 4, wherein the filler (48) comprises a longitudinally extending rope comprising glass fibres.

6. Blade according to claim 5, wherein the filler is arranged at the first inner surface.

7. Blade according to claim 1, wherein the entire surface of the beam core (22) including the lateral faces (24a, 24b), the end faces (52, 53) and the rounded or chamfered connection between each end face and each lateral face are covered by fibre layers.

8. Blade according to claim 1, wherein the beam core (22) is made of a material having a lower density than the fibre-reinforced polymer.

9. Blade according to claim 8, wherein the beam core (22) is made of a foamed material or of balsawood.

10. Blade according to claim 9, wherein the foamed material is a foamed polymer.

11. Blade according to claim 8, wherein the material has a lower density than the polymer.

12. Blade according to claim 1, wherein the beam (15) is substantially symmetrical about a longitudinal central plane.

13. Blade according to claim 1, wherein the beam (15) is manufactured by vacuum assisted resin transfer (VARTM).

14. Blade according to claim 1, wherein the beam (15) is manufactured by using fibre materials pre-impregnated with resin (prepreg.).

15. Blade according to claim 1, wherein the connections between at least one of the end faces (52,53) and the adjacent lateral faces (24a, 24b) of the beam core (22) are formed by a section of a circle extending between the lateral faces.

16. Blade according to claim 15, wherein the section of the circle is a half circle as seen in cross section.

17. Blade according to claim 1, wherein the lateral faces (24a, 24b) of the beam core are essentially parallel.

18. Blade according to claim 1, wherein the lateral faces (24a, 24b) of the beam core converge towards each other from the first towards the second end face.

19. Blade according to claim 1, wherein the blade has a length of at least 35 meters.

* * * * *